Dec. 26, 1939. K. W. ROHLIN 2,184,849
HEAT CONTROLLING SYSTEM
Filed May 2, 1935 10 Sheets-Sheet 3
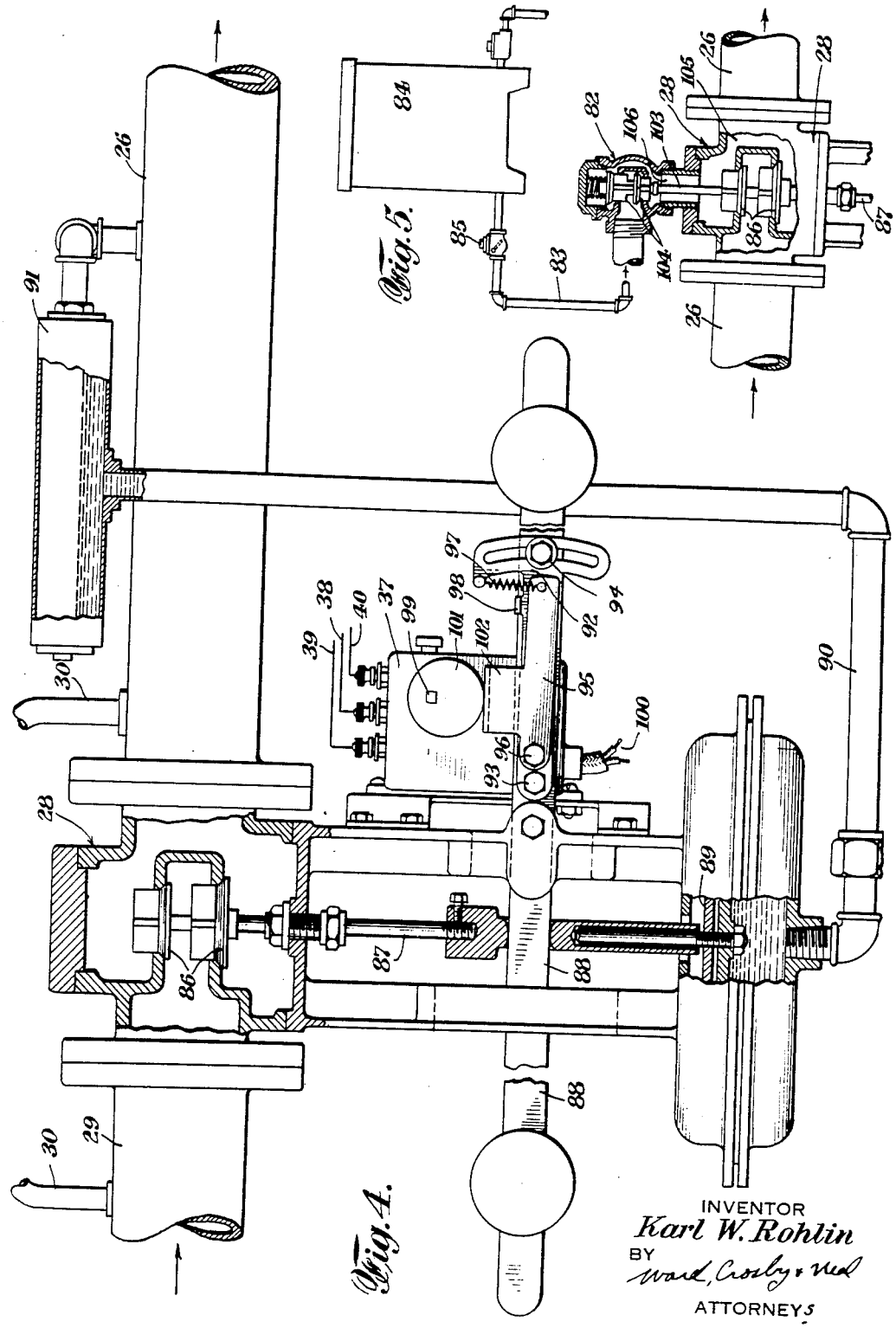
INVENTOR
Karl W. Rohlin
BY
Ward, Crosby & Ned
ATTORNEYS

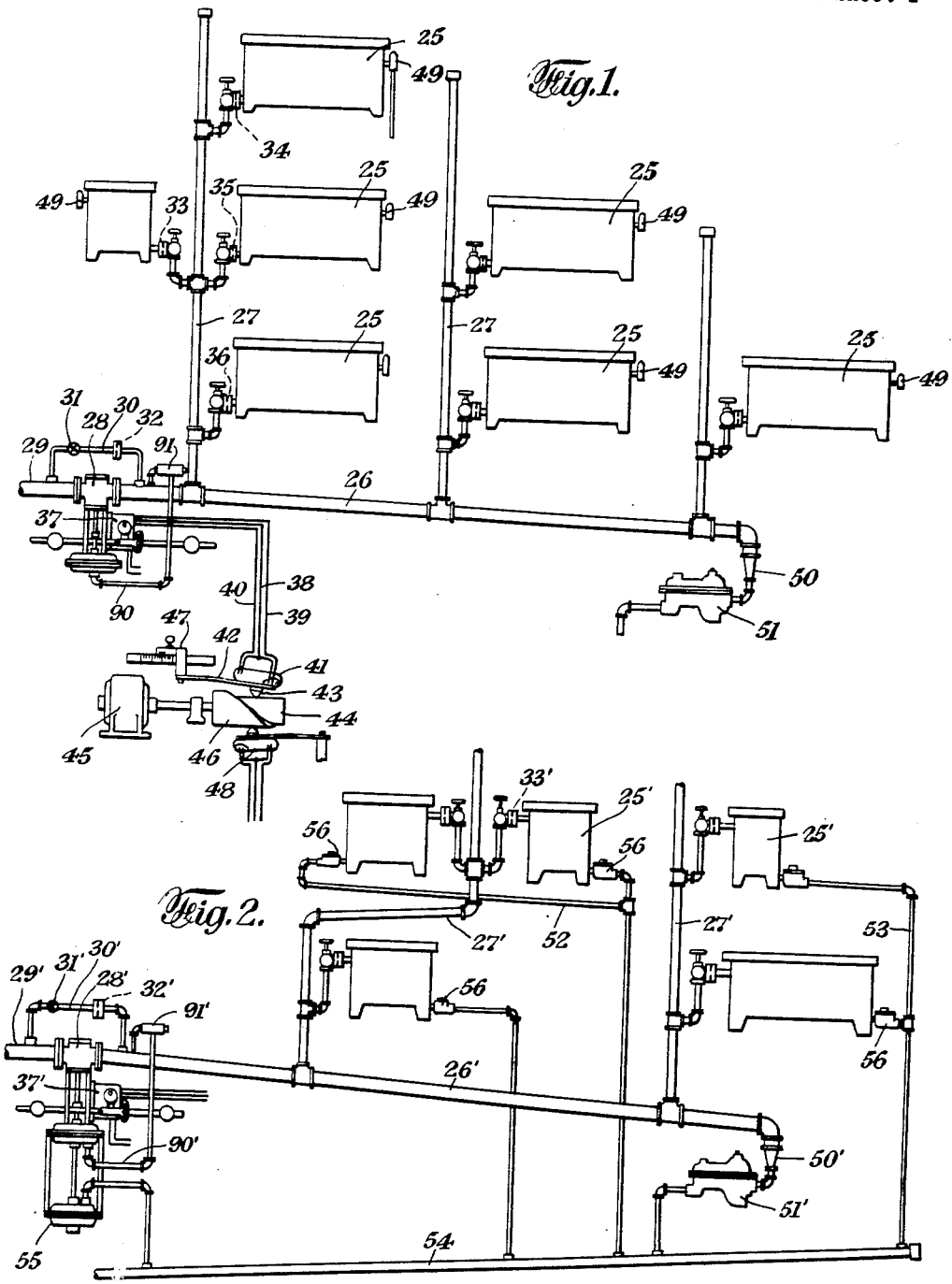

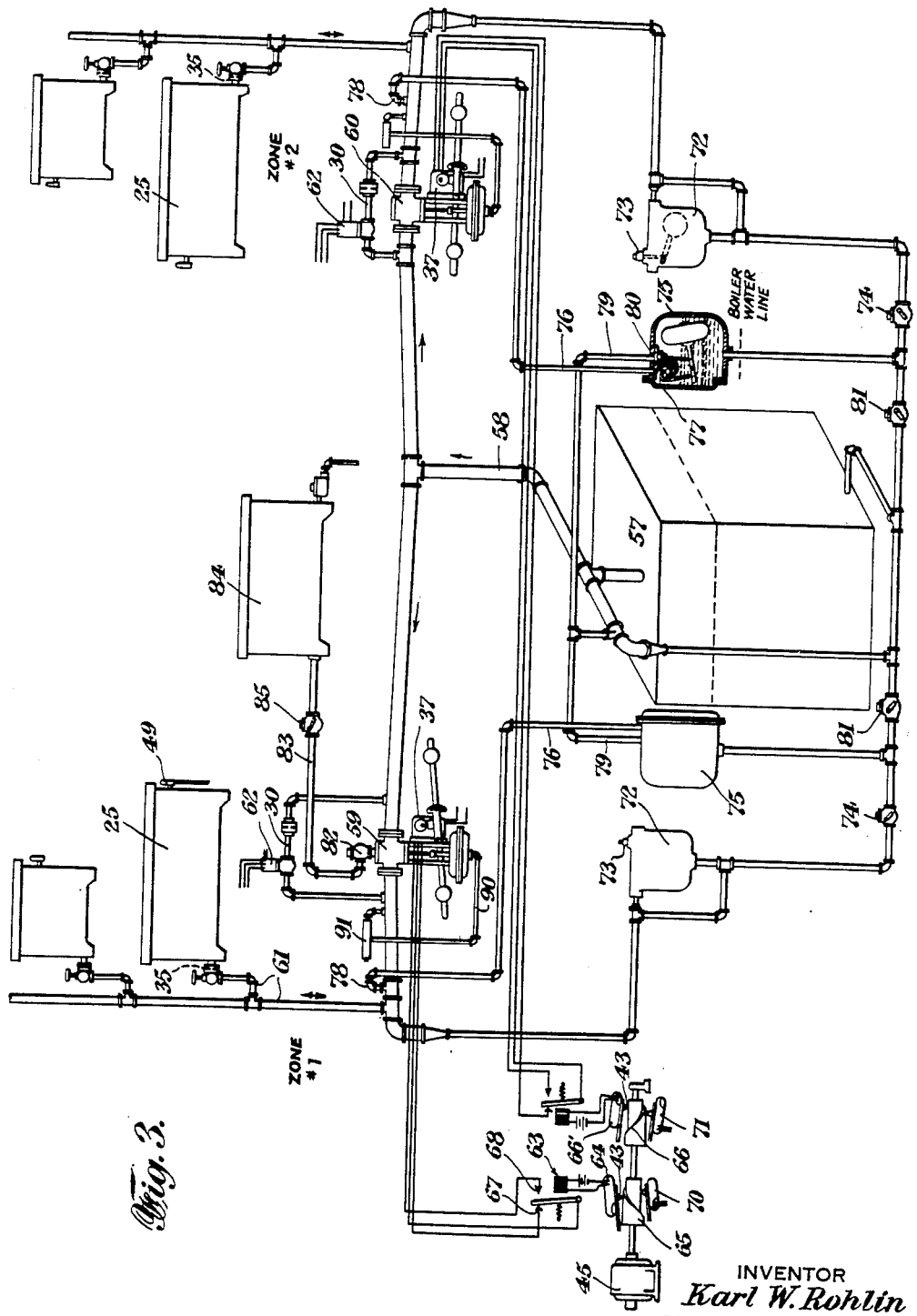

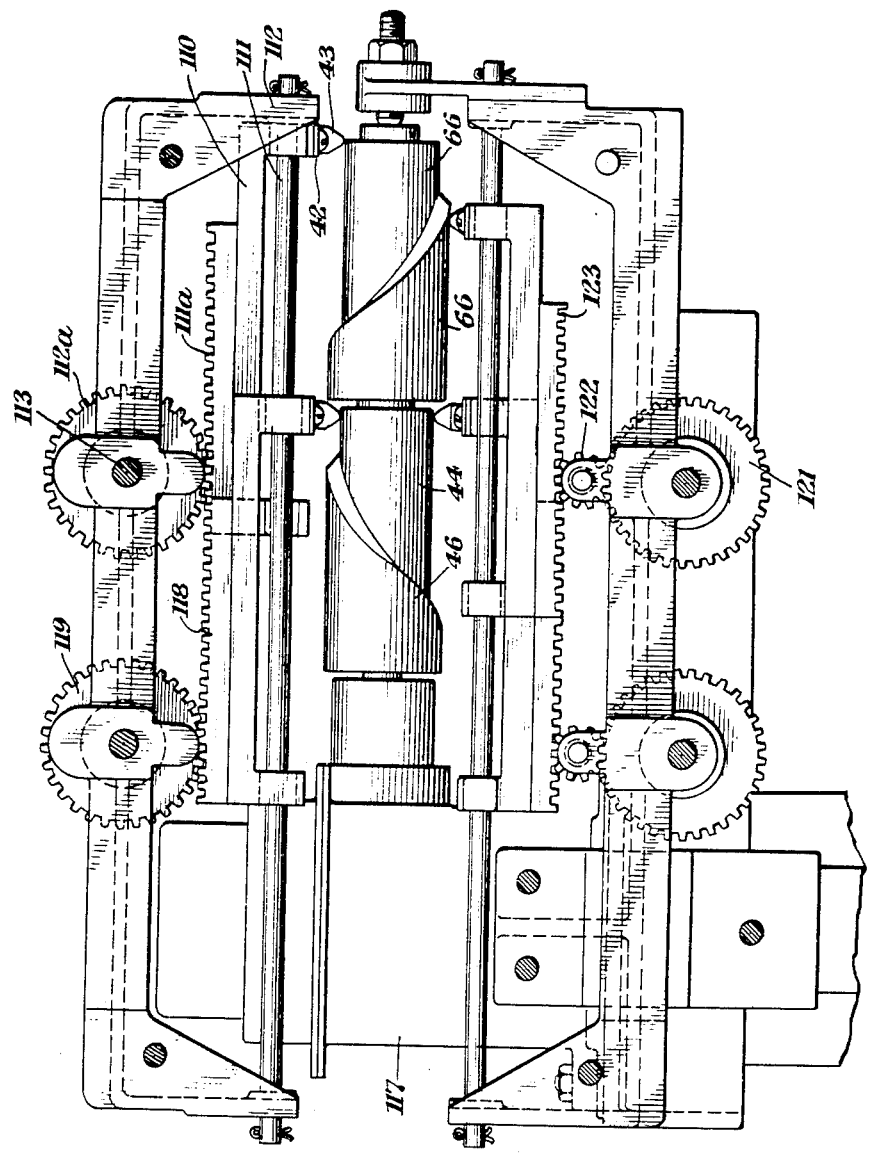

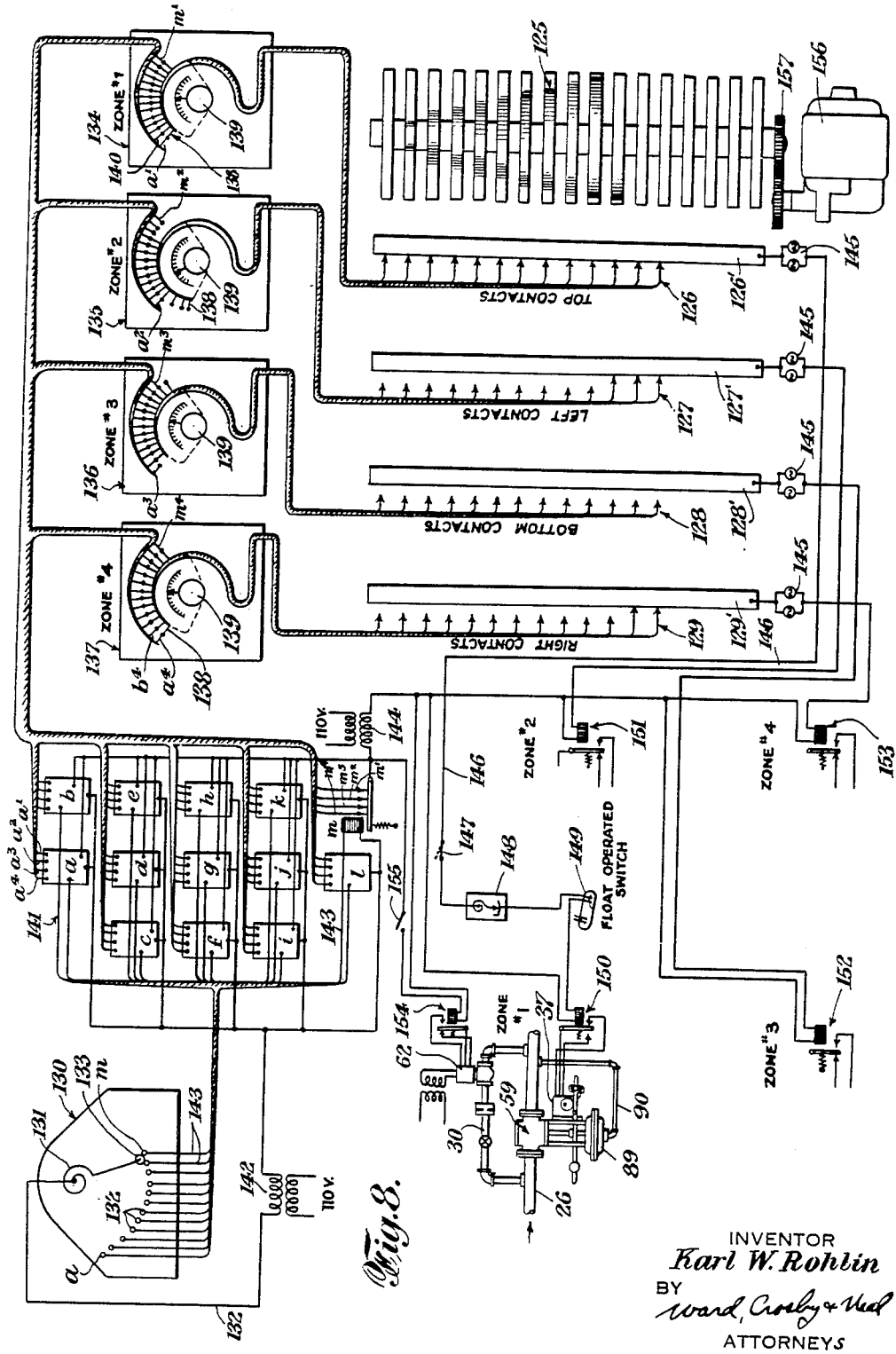

Dec. 26, 1939.  K. W. ROHLIN  2,184,849
HEAT CONTROLLING SYSTEM
Filed May 2, 1935   10 Sheets-Sheet 7
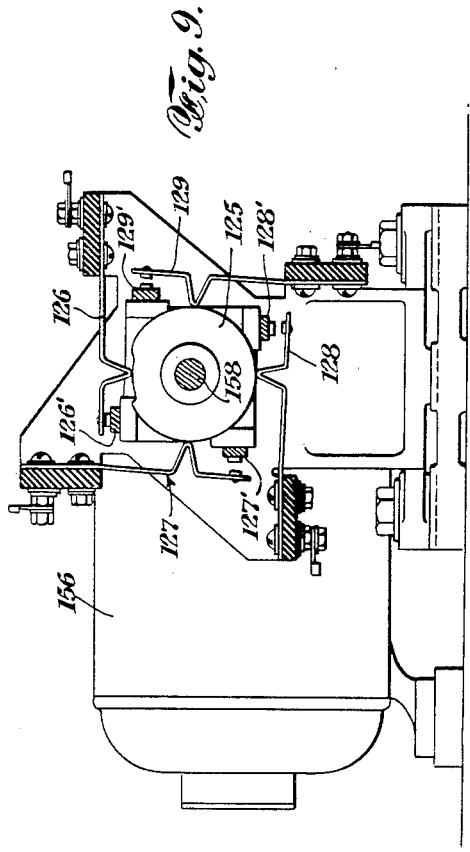
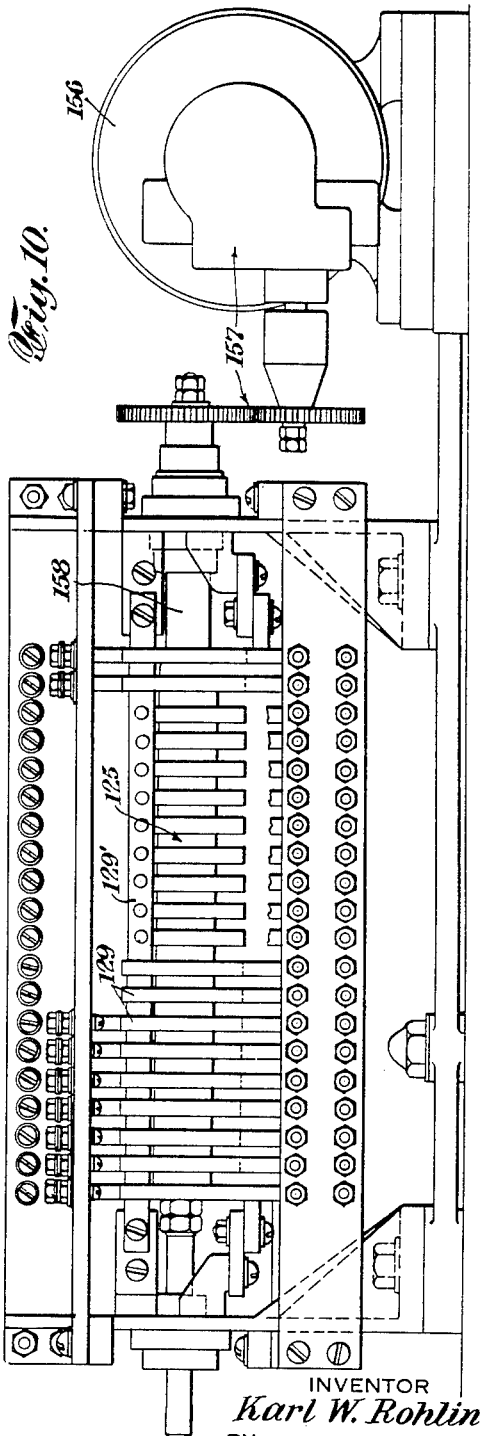
INVENTOR
*Karl W. Rohlin*
BY *Ward, Crosby & Neal*
ATTORNEYS Dec. 26, 1939.    K. W. ROHLIN    2,184,849
HEAT CONTROLLING SYSTEM
Filed May 2, 1935    10 Sheets-Sheet 8

INVENTOR
Karl W. Rohlin
BY Ward Crosby & Neal
ATTORNEYS

Dec. 26, 1939.　　　K. W. ROHLIN　　　2,184,849
HEAT CONTROLLING SYSTEM
Filed May 2, 1935　　　10 Sheets-Sheet 9
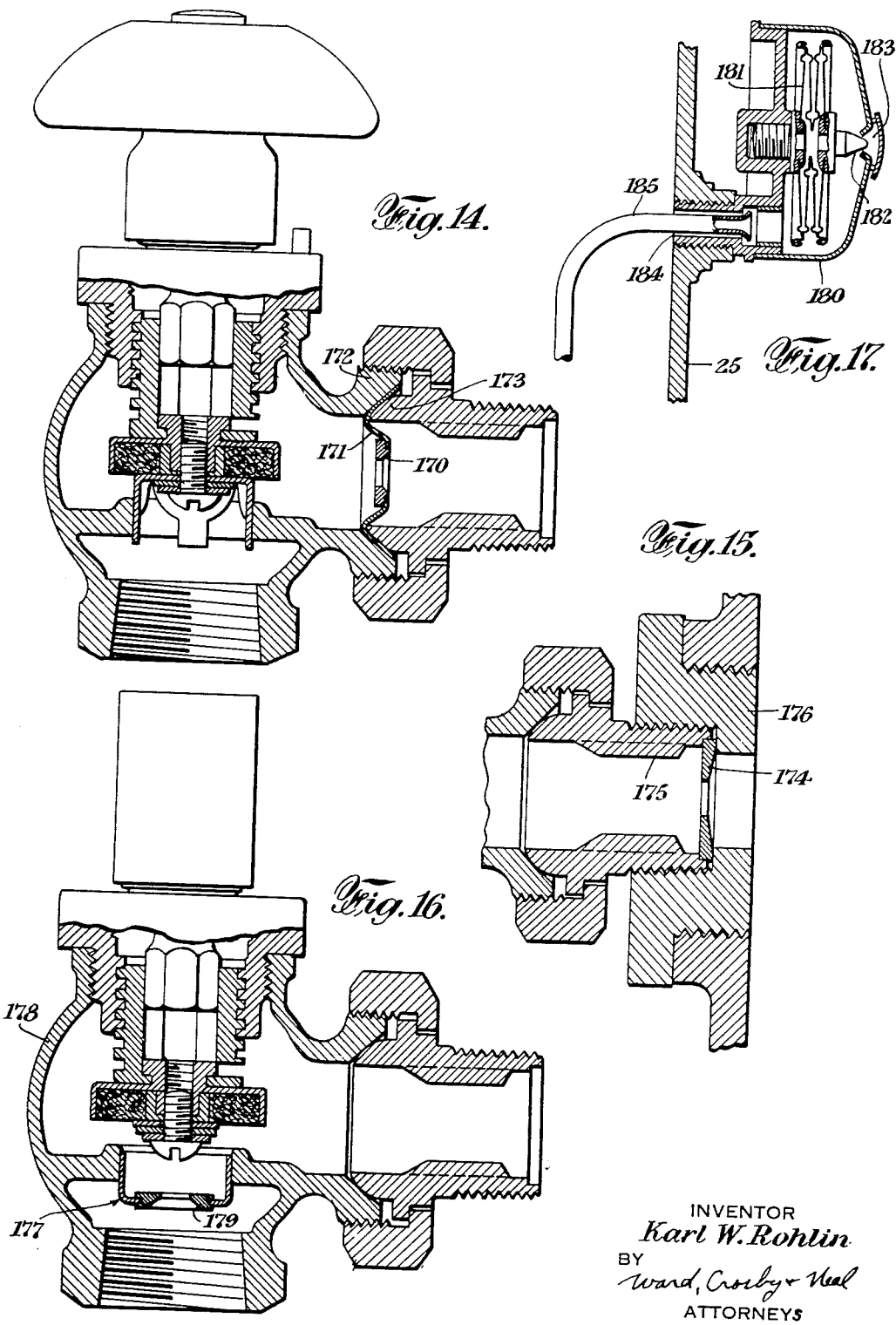

Dec. 26, 1939.  K. W. ROHLIN  2,184,849
HEAT CONTROLLING SYSTEM
Filed May 2, 1935   10 Sheets—Sheet 10
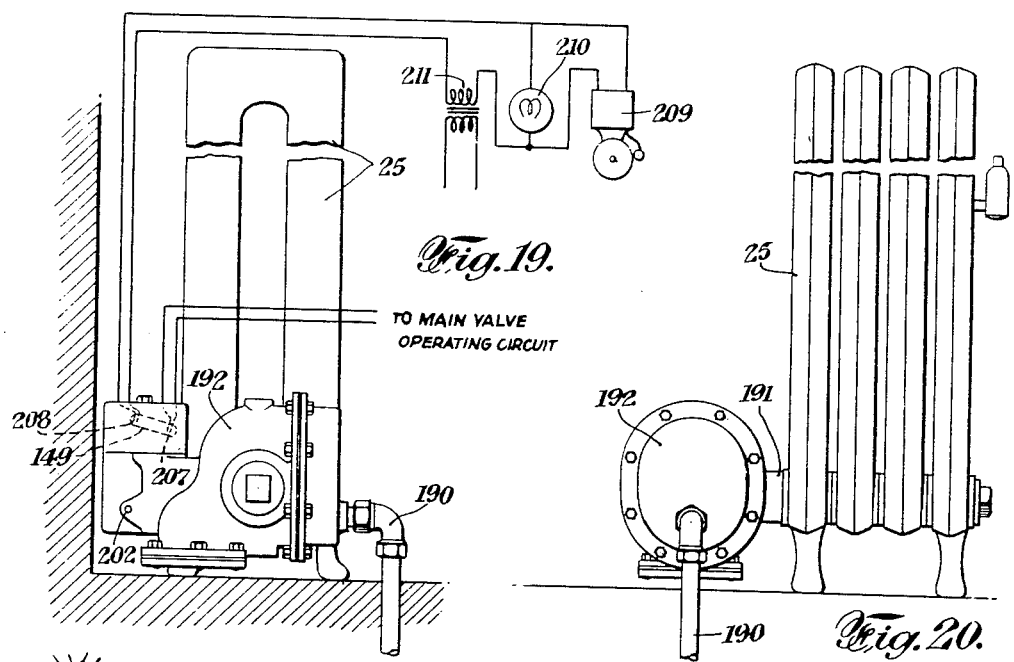
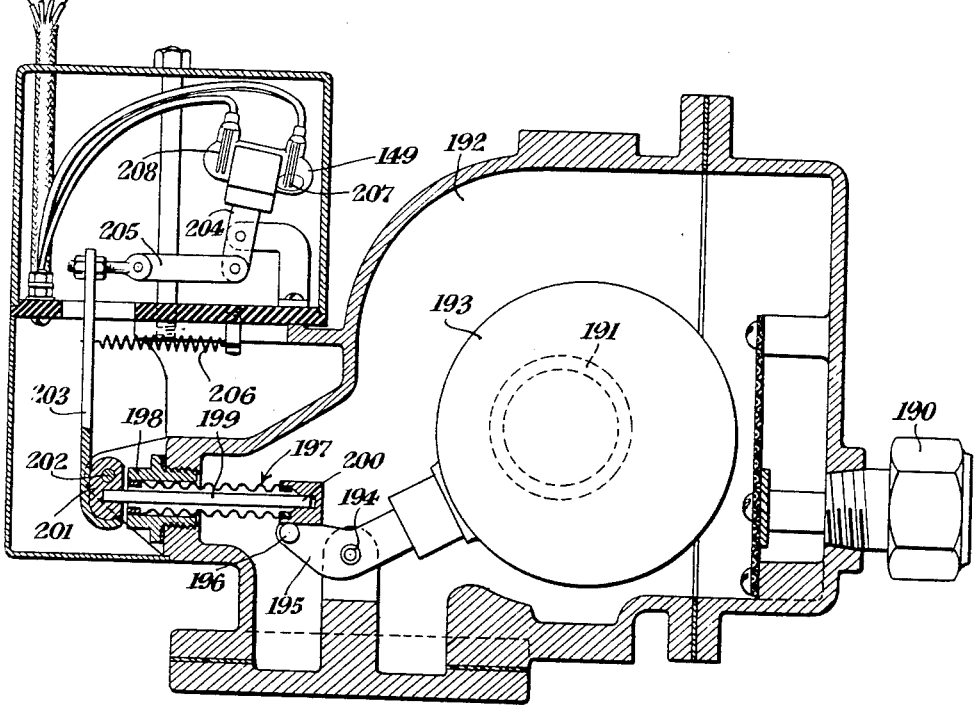
INVENTOR
Karl W. Rohlin
BY
Ward, Crosby & Neal
ATTORNEYS Patented Dec. 26, 1939

2,184,849

UNITED STATES PATENT OFFICE 2,184,849

HEAT CONTROLLING SYSTEM

Karl W. Rohlin, Merchantville, N. J., assignor to Warren Webster & Company, Camden, N. J., a corporation of New Jersey Application May 2, 1935, Serial No. 19,397

24 Claims. (Cl. 237—9)

This invention relates to apparatus and methods of providing a measured supply and distribution of steam or the like in heating systems.

The purposes of the invention include the provision of improved heating systems and methods of steam distribution which will in practice, economically eliminate the causes of unsatisfactory operation, discomforts and wastefulness existing in various systems heretofore used. The invention is adaptable not only to new installations but also may be quickly and economically applied to existing systems of inferior design, to correct the unbalanced and uncontrolled steam supply and distribution therein.

The invention is particularly useful in connection with systems commonly known as "one-pipe" steam heating systems, although various features of the invention may also be applied with substantial advantages to open or closed return "two-pipe" systems. Although many "one-pipe" systems have in the past been installed in large buildings, the inherent difficulties and unsatisfactory operation of such "one-pipe" systems have caused designing engineers to substantially discontinue their use for large installations under the belief that the difficulties were insurmountable and notwithstanding the relatively much smaller cost of "one-pipe" systems. The difficulties of this type of system have largely arisen from the fact that a single pipe is used both to convey the steam to the heating units and to convey the condensate back to a point of disposal. Thus the steam was required to travel countercurrent to the condensate, with the consequence that even upon resort to the expense of oversized piping or relatively higher pressures, the condensate did not freely return and great difficulties also were experienced in supplying steam to the various radiating units in the desired proportions. In "two-pipe" systems, in an effort to secure the desired distribution of steam to the various radiators, resort has been had to restricting means such as properly proportioned fixed orifices at the various radiators and other points in the system, as disclosed for example in the patent to Donnelly, No. 1,681,725, granted August 21, 1928. Yet, if this were attempted with the usual "one-pipe" systems, the difficulties of securing the two-way flow of fluids through one system of conduits would be greatly increased or made substantially impossible in practice at many of the points of restriction. Most of the improvements in the construction and operation of controlled steam heating systems, such for example as the use of the restricting orifices of predetermined size for each radiator, and the controlled supplying of steam to the steam main in accordance with varying weather conditions, have not been made adaptable for successful practical use in "one-pipe" systems.

In overcoming the difficulties of controlling the distribution of steam in "one-pipe" systems, according to one phase of my invention, I provide a method of operation utilizing a timing device for causing steam to be applied to the system at controlled pressure, during each of a succession of relatively short and properly spaced periods, and utilizing the intervening intervals between such periods for the withdrawal of the condensate accumulated in the radiators during the previous period; and according to this method, the flow of steam may be accurately distributed to the various radiators by the use of restricting means in the steam connections to each radiator respectively, so that steam is applied to each, in amounts bearing substantially the same proportional relationship for each radiator to its heating capacity, and without interference with the condensate flowing through the conduits during the intervening intervals. Also according to my invention the amounts of steam intermittently supplied during each of the succession of short periods, may be adjusted, or if desired, accurately regulated in accordance with the prevailing outdoor temperature changes, so that the steam supplied to each radiator is varied in accordance with the system's heating requirements, whether moderate or maximum. In accordance with this system and method, the steam as supplied during each of the succession of spaced periods, may be of such substantial pressure even during mild weather, as to cause a decisive flow, so that its amount and pressure may be very accurately regulated, and such that the steam promptly reaches in the desired proportions, all the radiating units of the system, even though the piping system may be of an early design, poorly proportioned or having sections in which condensate tends to accumulate to an extent which would interfere with and restrict any gentle flow of steam such as available during mild weather with systems of the usual type.

Various further and more specific objects, features and advantages will clearly appear from the detailed description given below taken in connection with the accompanying drawings forming a part of this specification and illustrating by way of example various preferred embodiments of the invention. The invention consists in such novel features, arrangements, combinations of parts and methods as are described in connection with the apparatus herein disclosed, by way of example only.

In the drawings,

Fig. 1 comprises a schematic diagram of a "one-pipe" heating system embodying certain features of my invention;

Fig. 2 is a similar diagram illustrating a "two-pipe" steam heating system;

Fig. 3 comprises a schematic diagram of a steam heating system embodying certain features of my invention as applied to an installation where the radiating units are divided into two or more groups or zones which may be independently controlled although supplied with steam from a common source;

Fig. 4 is an elevational view partly in section showing one form of motor operated pressure regulating valve which may be embodied in the systems above referred to;

Fig. 5 illustrates in part an alternative embodiment of the valve of Fig. 4 which may be used with my invention;

Figs. 6 and 7 are elevational and side views partly in section of a form of time controlled switch mechanism which may be embodied in the systems above referred to;

Figure 12:
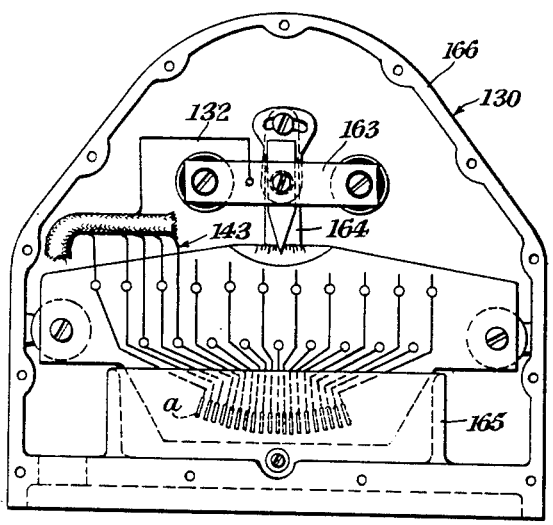
Figure 11:
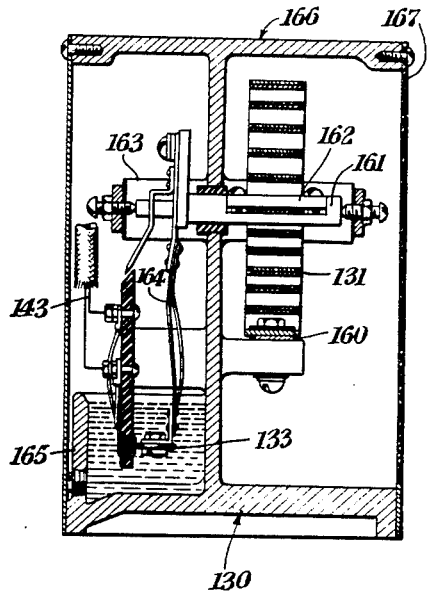
Figure 13:
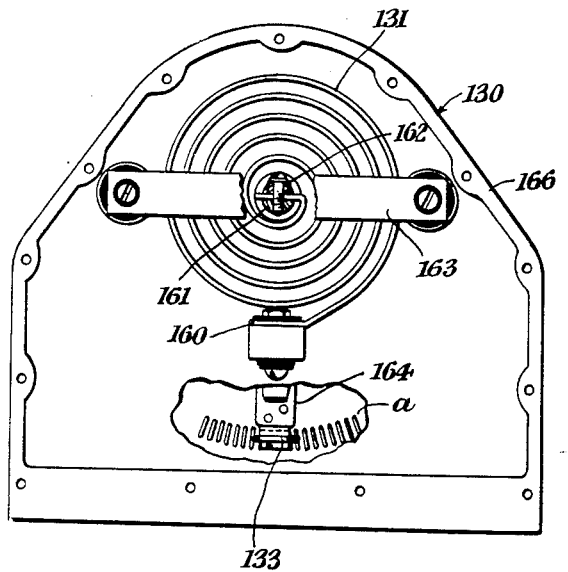

Fig. 8 comprises a schematic diagram of a heat controlling system which may be similar to those of Figs. 1 to 3, but with additional means for thermostatically controlling the periodic flow of steam to radiators in a plurality of groups or zones;

Figs. 9 and 10 respectively are end and side elevational views of certain switch mechanism of the system of Fig. 8;

Figs. 11, 12 and 13 illustrate the details of construction of a thermostat which may be embodied in the system of Fig. 8;

Figs. 14, 15 and 16 illustrate various preferred forms of restricting orifice members which may be used in the systems above referred to;

Fig. 17 is a vertical sectional view of a form of radiator air valve which may be used, for example, in the system of Figs. 1 and 3; and Figs. 18, 19 and 20 illustrate certain float operated switch mechanism and circuit connections therefor, which may be used with my invention.

Referring now to Fig. 1, the system there schematically shown may comprise a plurality of radiators of conventional type as at 25 located in the various spaces or rooms of a building or structures to be heated. All of these radiators as shown may be connected by a "one-pipe" conduit system comprising a steam main 26 with risers to various parts of the structures as at 27, 27. The steam main 26 may be connected through a pressure reducing or pressure regulating valve 28 to a supply conduit as at 29 connected to a boiler, a central heating plant or other source of steam supplied at either a varying or more or less constant pressure, higher than the maximum pressure required in the main 26.

The valve 28 may be accompanied by a relatively small by-pass conduit as at 30. This by-pass is preferably provided with a valve as at 31 which may be used either for shutting off the steam or for adjusting the flow of steam through the by-pass. The by-pass may also be provided with a normally fixed orifice member as at 32 for restricting the flow of steam to a predetermined extent through the by-pass.

In the conduits to each of the radiators respectively, preferably substantially adjacent the inlets thereto, normally fixed orifice members may be provided as at 33, 34, 35 and 36. These orifice members are preferably formed with apertures of a predetermined size for restricting the flow of steam to each radiator to an extent depending upon the normal heating capacity thereof and the access of the steam source to each radiator. That is, for example, the steam source has access to each of the orifices 33 and 35 to substantially the same extent, these two particular orifices communicating with the steam source through piping of the same size and amount. However, the radiator connected at orifice 35 is larger than that at orifice 33 and accordingly the orifice 35 will in proportion, be larger than the orifice at 33. On the other hand, the radiators connected at orifices 35 and 36 are of equal size, but the steam source has more direct and immediate access to the orifice 36 and hence the orifice at 35 is made larger than that at 36 but smaller than the more remote orifice at 34. In general these various orifices at the radiator inlets are so proportioned by calculation or trial, that steam is supplied to each radiator respectively in amounts bearing substantially the same proportional relationship for each radiator, to its heating capacity.

The construction of valve 28 is shown in further detail in Fig. 4 and described hereinafter. It is noted at this point, however, that this valve is preferably operated by an electric motor 37, which may be so connected to the valve mechanism that when current of one polarity is applied to the motor, the valve will be moved to closed position, the motor then stopping, and when current is applied of the opposite polarity, the valve will be opened and will remain in open pressure regulating condition. In the arrangement as illustrated in Fig. 1, circuit connections 38 and 39 are provided for applying current of proper polarity to the motor to move the valve 28 to closed position, whereas circuit connections 38 and 40 are available to supply current of the opposite polarity for opening the valve. These connections may be controlled as indicated by a tiltable enclosed mercury switch 41 mounted upon a spring member 42 provided with a finger 43 for slidably engaging a cam 44 uniformly rotated as by a motor or clock mechanism at 45. The cam 44 may be provided around a part of its periphery with a raised surface as at 46, the arcuate extent of this raised surface varying gradually from a slight amount, beginning near the right hand end of the cam, to for example 360° at a point near the left hand end of the cam. The spring 42 may be mounted upon a manually slidable support as at 47 so that the position of the mercury switch 41 and finger 43 carried by the spring may be adjusted longitudinally of the cam. When the raised area of the cam engages the finger 43, the mercury switch is tilted from the position shown with the circuit wires 38 and 39 connected, into a position such that these wires are disconnected, and wires 38 and 40 will be connected to thus reverse the polarity applied to motor 37. Accordingly with each rotation of the cam 44 the valve 28 is opened for a short interval and also closed for a short interval, with the cycles of operation of uniform length, but the relative lengths of the periods when steam is turned "on" and the intervening intervals when steam is turned "off", will vary depending upon the longitudinal adjustment of the support 47 in respect to the cam 46. This adjustment is made in accordance with varying weather conditions.

If desired, the cam 46 may be utilized to operate one or more other switches as at 48 connected and mounted in a manner similar to the switch 41 but for the purpose of operating a control valve for radiators of another group or heating zone. With the switches 41 and 48 mounted at an angular relationship in respect to the cam, 180° apart as shown, the valve 28 will be operated at intervals interspaced with the operation of the valve controlled by the switch 48, and accordingly if the same steam source is used for the two different heating zones, the load on the steam generating means or source will be distributed, and free of serious fluctuations, notwithstanding the periodic interruption of the supply of steam to each zone.

With the above described arrangement, steam may be admitted to the steam main 26 during each of a succession of short periods which may, for example, be made to vary in length from a small fraction of a minute during relatively warm weather, to from 5 to 10 minutes during the coldest weather. The frequency of the cycles of operation may be adjusted by adjustment of the speed of the motor or clock works 45 depending upon the capacity of the steam source, and the capacity and extent of the radiating system. The equipment will satisfactorily operate with most systems if adjustment is made for providing an "on" period of in the neighborhood of 10 minutes when the system is subjected to its maximum heat demand. At the same time the cam 46 should preferably be so designed that during each cycle of operation an "off" interval of at least a predetermined length will occur (for "one-pipe" systems particularly), sufficient to allow the greater part of the condensate accumulated in the radiators during the previous "on" period, to drain out of the radiators through the restricting inlet orifices and through the risers, even when the system is subjected to its most severe heating requirements. In installations of average type and size, such a predetermined minimum "off" interval in the neighborhood of one minute, is sufficient.

During the interval between the steam supply periods, the by-pass 30 around the valve 28 will supply a small amount of steam to the conduits of the system, and for this purpose the by-pass orifice at 32 should preferably be made with an aperture of a predetermined size just sufficient to admit enough steam to keep the conduit system substantially heated during the "off" intervals but without causing any substantial amount of steam to pass through the radiator inlet orifices during such "off" intervals. Also in some cases, it may be advisable to restrict the flow of steam through the by-pass to such an extent that during the greater part of the "off" intervals there will be a slight vacuum within the conduit system for aiding in the withdrawal of the accumulated condensate from the radiators during such intervals.

With the conduits thus kept filled or partially filled with steam during the "off" intervals, upon the beginning of each "on" period, an effective flow of steam will promptly start through all of the radiator inlet orifices at substantially the same time. Thus from the beginning of each of said "on" periods, steam is supplied through the restricting orifices to the various radiators respectively in amounts bearing substantially the same proportional relationship for each radiator, to its heating capacity.

Each of the radiators 25 may be provided with an air valve or an air line valve as at 49, and accordingly during each "on" period of steam flow, air will be expelled from the radiators during the filling or partial filling thereof. The valves 49 may preferably be of a thermostatically operating type designed to promptly close when the radiators are filled to the point where the heat of the steam reaches the valves.

However, when the heating requirements of the system are moderate or substantially less than maximum, as is the case during the larger part of the time with most heating systems, the radiators will be only partially heated with steam during each of the "on" periods, and yet during each of such periods, each radiator respectively will be heated to substantially the same proportion of its maximum capacity.

At the beginning of each "off" interval, the condensation of steam in the radiators will soon tend to create a slight vacuum therein, but the air valves if not already open, will soon open, and permit substantial quantities of air to be drawn into each radiator and this air will aid in expelling the accumulated condensate from the radiator through the restricted inlet orifice, unhampered by any incoming steam. This action will, as above stated, be further aided if the conduits are maintained at a slight vacuum during the greater part of the "off" interval. Thus all or the greater part of the condensate accumulated in the radiators during the previous short "on" period may be very quickly withdrawn, and in fact substantially forced back into the conduit system quite promptly, notwithstanding the orifice restrictions. Thus the orifices at the various radiators may be used to full advantage in distributing the periodic supplies of steam in proper proportions to various parts of the system unhampered by any substantial accumulations of condensate, yet at the end of each "on" period the resulting small accumulations of condensate are promptly expelled unhampered by any counter-current flow of steam. Instead, the removal of the condensate is in fact aided by the slight vacuum conditions resulting from condensation of steam of the previous period.

If as above indicated, the duration of the "off" interval is made equal to or greater than a predetermined minimum, the condensate will not only be withdrawn into the risers but will also have opportunity to flow into the steam main as at 26, which preferably is positioned at an inclination running downwardly from the valve 28, to a suitable drip connection as at 50, from which the condensate may pass out through a steam trap as at 51 and thence to means for its disposal, either in sewers or by apparatus for returning the water to the steam generator.

With the embodiments of my invention here shown, the regulating valve as at 28 serves to admit steam to the system during each of the succession of periods, at a predetermined pressure notwithstanding possible substantial fluctuations in the pressure of the source of supply. Hence with these periods of constant pressure, the quantity of steam admitted to the system may be adjusted or regulated to a high degree of precision by the clock controlled cam switch means 41, 44, 45 which determines the proportion of elapsed time occupied by the "on" periods. Also, not only is the quantity of steam admitted to the steam main thus accurately controlled, but the quantity admitted during each "on" period to each part of the system is also accurately controlled, due to the fact that at the beginning of and during each "on" interval, the steam is distributed in the desired proportions without delay through each radiator inlet orifice and without any irregular or unintended obstruction by condensate.

For purposes of illustration, let us assume that the speed of the motor or clock works 45 is adjusted so that each complete cycle of operation of this system requires five minutes including a minimum required "off" interval of one minute to permit the radiators to drain. Then the remaining four minutes of the cycle will be occupied by the "on" period during the coldest weather, whereas in mildest weather when no heat is required, the cycle will be made up of the one minute minimum "off" interval plus a four minute "off" interval. Therefore with such a cycle of operations the portion of the cam 44 which is in active operation during coldest weather, will have a raised surface extending around four-fifths of its circumference, and the portion of the cam in operation during mildest weather will have no raised surface. At the half way point axially of the cam, corresponding for example to an outdoor temperature of 35° F., the raised surface will comprise two-fifths of the circumference of the cam, and the lowest surface three-fifths. With this particular example of the operation of the system at 0° F., steam may pass through the regulating valve at a pressure of say, two pounds gauge in the steam main 26, and assuming a pressure drop of one pound in the piping, the steam will pass through the various radiator orifices in the desired proportions and eventually fill each radiator with steam at atmospheric pressure. The flow of the steam may continue for a period of four minutes, whereupon the minimum one minute "off" interval begins. If during this "off" interval, the mercury switch 41 remains in a position corresponding to 0° F., the regulating valve 28 will remain closed for one minute, while steam in smaller volume will be admitted through the by-pass 30 for keeping some steam in the piping, but insufficient to flow through the radiator orifices. However, if the position of the switch 41 is moved to a new point in respect to the cam, the relative lengths of the "on" periods and "off" intervals will be correspondingly altered within the five minute cycle.

The severest test of any heating system is its ability to provide for the maximum demand during coldest weather and if the "off" interval is first properly determined by trial for the conditions of maximum demand, then the desired proportional heating during times of higher outdoor temperatures, may readily be secured by corresponding adjustments of the position of the cam in respect to the switch 41.

During the "on" period of four minutes a steam supply pressure of say two pounds is sufficiently great to fully heat the metal of the radiator after its slight cooling during the previous one minute "off" period so that substantially full heat is delivered from the radiator when desired.

The features of the invention above described may be quickly applied at relatively small expense, to existing unsatisfactory "one-pipe" installations. Often it is merely necessary to install and adjust the pressure regulating valve and its associated control apparatus and by-pass, and to install the properly proportioned orifice members at the radiator inlets. The resulting controlled supply and distribution of steam enables very substantial savings of expense for steam while providing fully satisfactory and uniform heating in lieu of the almost universally unsatisfactory heating conditions with the usual large "one-pipe" installation.

Similar methods may be used to advantage in "two-pipe" systems, particularly to correct faulty piping conditions in existing installations which cannot be corrected by piping alterations because of the prohibitive expense.

Referring now to the "two-pipe" system schematically shown in Fig. 2, various parts which are similar to corresponding parts of Fig. 1 are identified by the same reference characters respectively accompanied by prime marks. In this system the various radiators 25' in lieu of being provided with air valves, are connected with condensate return pipes as at 52 and 53 extending to a return main 54, which may be of the "open return" type for the gravity return flow of the condensate, or if desired, of the "closed return" type where the return main 54 communicates with any suitable well-known type of apparatus for maintaining a vacuum therein. If a "closed return system" is used, then the pressure regulating valve 28' may preferably be provided with additional diaphragm control means as at 55 in communication with the return main 54 whereby the valve operates to regulate the pressure of steam supply during each of the succession of "on" periods in accordance with the difference of pressure between the steam and supply mains. Thus, with the embodiment of my invention here shown, the steam supply during the "on" period may be preferably so regulated that a substantially constant pressure difference is maintained, with the result that the effective quantity of heat supplied to the system during "on" periods of given length is maintained substantially constant. As in the case of Fig. 1, the proportion of the elapsed time occupied by the "on" intervals and thus the quantity of heat supplied to the system during a given time, may be adjusted or regulated by time controlled switch mechanism controlling the motor 37'. In cold weather, however, the "two-pipe" system need not necessarily have an "off" period although the "off" period is frequently an advantage in facilitating the drainage of water from small or improperly installed piping, from which the water may not properly escape during periods of steam flow.

The outlets of each of the radiators to the return piping may preferably be provided with steam traps as at 56 of a suitable well-known type adapted to normally permit condensate to flow therethrough, but closing against the exit of steam when the radiators are filled to an extent such that the heat of the steam reaches the traps.

The operation of the system of Fig. 2 in many respects is similar to that of Fig. 1. The steam is supplied through the valve 28' during each of a succession of controlled short periods properly spaced as before, but the pressure during each of said periods is regulated to a substantially constant pressure difference as between the supply and return mains. The various radiators are provided with orifices as at 33' properly proportioned to insure supplying to each of the radiators during each period, steam in amounts bearing substantially the same proportional relationship for each radiator to its heating capacity; and the by-pass 30' serves to supply the small amount of steam during intervals between periods so that at the beginning of each "on" period steam in the predetermined proportions is promptly admitted to all of the radiators substantially simultaneously. The maintenance of the piping in substantially heated condition during the "off" intervals also, as in the case of the system of Fig. 1, avoids any substantial contraction or expansion of the piping which would otherwise occur because of the intermittent steam supply. Thus, audible annoyances resulting from expansion of contraction and the wearing of the joints as the result of such action, are avoided.

During each "on" period the various radiators may be fractionally heated in the same proportion for each radiator, to its normal capacity, and in that event, if the radiator outlet steam traps remain open, the condensate is free to flow out through the return piping aided, if desired, by any vacuum maintained in the return main. Or if as in coldest weather, the radiators are fully heated, the outlet traps will almost close and permit only relatively cool water of condensation and non-condensable gases from the radiators to pass through. During the "on" periods the concentration of the flow of steam into spaced periods, insures that during such periods even in moderate weather, a sufficiently decisive flow of steam will occur to enable its accurately proportioned distribution through the various radiator orifices.

There will of course be some condensation of steam in the supply risers and connections as at 27' but during each short "on" period this will be insufficient to hamper the desired proportional distribution of steam, and, when such piping is small, during the succeeding "off" interval ample opportunity will be afforded for such small amount of condensation in the supply piping to return to the steam main 26' unhampered by any countercurrent flow of steam. Such condensate may be withdrawn from the steam main 26' if desired in a manner similar to the system of Fig. 1. Thus even though the piping may be of an early inferior design having for example relatively long substantially horizontal steam supply connections as at 27', no troublesome amount of condensate will ordinarily be permitted to accumulate in the supply lines. Similarly, if the piping system should include in the return lines any extended substantially horizontal sections as at 52, the supply of a decisive flow of steam at spaced periods to the radiators, will provide sufficient pressure to vent the radiators adequately even though water tends to obstruct some of the return piping.

Reference will now be had to Fig. 3 schematically illustrating a typical "one-pipe" heating system of the gravity return type wherein the radiators are located in two or more groups for supplying a plurality of separate zones of a large building or a group of buildings with steam from a common source. A boiler or other source of steam may be provided as indicated at 57. A steam main is shown at 58 having a branch running to a regulating valve as at 59 for one of the zones (zone #1), and another branch running to a regulating valve 60 for another zone (zone #2). From each of these regulating valves respectively a "one-pipe" conduit system as indicated at 61 is provided to connect the radiators 25 of each zone to the steam main, through the regulating valves. The radiators may be provided with air valves or air line valves 49 and with normally fixed orifice members 35, etc. of predetermined size as in Fig. 1. Each of the regulating valves also may be accompanied by a by-pass as at 30 and as in Fig. 1. If desired, these by-passes may be provided with motor operated shut-off valves as at 62 so that they may be controlled from a more or less remote point if desired. Each of the regulating valves as at 59 and 60 may be operated periodically by a motor 37 as in Fig. 1, and the control wires for the motors of the valves for the various zones may extend to a central point as indicated. In the particular example shown in Fig. 3 the control wires for each valve motor may extend to a relay as at 63, which relay in turn may be controlled by a mercury switch 64 operated by a cam 65 in a manner similar to the operation of the cam controlled switches in Fig. 1. If desired, an additional cam as at 66 may be provided on the same shaft with cam 65 for controlling the switches for additional zones. With the use of the relays as at 63, two contacts only need be provided in the mercury switches, since the relay may be provided with a "break" contact as at 67 for applying the proper polarity to the regulating valve motor to move the valve to open position. A relay "make" contact as at 68 may be provided for applying to the valve motor the reverse polarity for causing the valve to close whenever the mercury switch 64 is tilted by the operation of the cam, into a position for closing a circuit through the relay magnet.

As indicated, the cams 65 and 66 may be of like shape but arranged on a common shaft in an angular relationship 180° apart. Therefore the valve for zone #1 controlled by cam 65 will be opened during periods interspaced with the "on" periods for zone #2. And if the system includes for example two additional zones, switches as at 70 and 71 may be provided to control the same; the switches 70 and 71 respectively being operated by the cams 65 and 66, and being preferably positioned in an angularly spaced relationship, about the cam, in respect to the switches for zones #1 and #2. Thus, the "on" periods for the various zones may be controlled in interspaced relationship to provide a more uniform load on the steam generator than would be the case if such periods for all of the zones occurred simultaneously.

Drip connections for the condensate from the radiators of each zone may be provided as in Fig. 1, or preferably as indicated in Fig. 3, the condensate may be conducted to a trap as at 72 provided with a float operated air vent valve 73. From this trap the condensate may be passed at intervals through a check valve as at 74 and into a boiler return trap as at 75. The boiler return trap may be provided with an exhaust pipe 76 connected at one end to the trap through a valve at 77, and having its other end connected to a branch of the steam main as at 78 just beyond the regulating valve. The trap 75 may also be provided with a conduit 79 carrying steam at boiler pressure and connected to the trap through a valve at 80. As indicated, the valves 77 and 80 in the boiler return trap 75 may be arranged to be alternately opened and closed by a float in such manner that from time to time, boiler pressure is applied to the return trap for forcing condensate therefrom through a check valve 81 and into the boiler. Further and complete details as to the construction and operation of the traps 72 and 75 are disposed in the patent to Serrell, et al., No. 1,555,081, granted September 29, 1925.

As above explained in connection with the operation of the system as shown in Fig. 1, it may in some cases be found advisable to maintain the steam connections to the radiators at a vacuum during the "off" intervals in order to aid in withdrawing the condensate from the radiators. For a similar purpose it is in some cases desirable to provide means to very promptly reduce the pressure in these conduits at the beginning of each "off" interval. For this purpose the regulating valves for such zones as may require it, may be provided with a quick exhaust valve as at 82, operated for example by the valve stem of the valve 59 so that when the valve 59 is closed, the quick exhaust valve 82 is opened, permitting steam to be quickly exhausted from the radiator connections through a pipe 83 leading to any desired apparatus which may be provided for utilizing such exhausted steam. Such steam may be used for example in a radiator 84 for heating any desired part of the structure served by the system. A check valve 85 is provided to prevent return flow of air or steam from the radiator 84 back through the conduit 83. The details of construction of the quick exhaust valve 82 will be referred to hereinafter in connection with Fig. 5.

Except for the differences above pointed out, the operation of the system of Fig. 3 is similar to that above described in connection with Fig. 1.

In Fig. 4 the details of construction and the operating connections of one of the pressure regulating valves as at 28 are shown. This valve may include a pair of valve members as at 86 operated by a valve stem 87, the position of which is controlled conjointly oy a weighted lever 88 and a pressure diaphragm 89 subjected to pressure of the steam main 26 through a connection 90. A water accumulator 91 is preferably interposed in the connection 90. This is for the purpose of maintaining a substantially constant column of water pressure on the diaphragm 89 and so that minor variations in the steam pressure in the steam main 26 will not cause material variations in the height of the column of water of condensation in the connection 90, which would interfere with accurate regulation by the valve. That is, the chamber beneath the diaphragm 89 may normally be filled with water as well as the connection 90, and a part of the space within the water accumulator 91. The water in the accumulator 91 presents a surface of relatively large dimensions as compared with the cross section of the connection 90, so that the minor variations of steam pressure in the steam main do not materially alter the height of the column of water in these connections and accordingly the valve 28 is regulated more accurately in accordance with variations of steam pressure in the main 26.

The weighted valve operating lever 88 may be provided with an adjustable arm 92 pivoted at one end, as at 93 to the weighted lever, and attached at its other end to the weighted lever by an adjustable pin and slot connection at 94. An additional arm 95 may be pivotally mounted at one end as at 96 on the arm 92. The other end of the arm 95 is normally held up by a spring 97 against a stop member 98, formed on the adjustable arm 92, but when the valve seats, as shown, it leaves the stop to absorb excess movement imparted by cam 101. As indicated, the ends of the spring 97 respectively may be connected to the arms 95 and 92.

The motor 37 may be of a well-known type designed and provided with the necessary self-contained control means, to rotate a shaft as at 99 through an angle of 180° when current of one polarity is applied to the control connections, the rotation being then automatically stopped but continuing again through another angle of 180° upon applying the opposite polarity to the control connections. The control connections 38, 39 and 40 above referred to are also indicated in Fig. 4. The connections for the source of power to the motor assembly are indicated in Fig. 4 at 100. Motor assemblies operating in the above described manner and provided with self-contained stop means for that purpose, are well-known in the art and hence the details of construction and operation of the same need not be here further explained. A cam 101 may be fixed eccentrically upon the shaft 99 and when this cam is rotated to its lower position as shown in Fig. 4, it is adapted to engage a flanged extension at 102 forming a part of the arm 95. With the parts in this position the valve is held in closed condition, but when the cam 101 is rotated to its uppermost position, i. e. when the polarity applied through the motor control connections is reversed, then the weighted lever 88 is free to move in a position for opening the valve. The weights on the lever 88 are normally adjusted to retain the valve in open condition until the pressure applied to the diaphragm 89 minus the pressure of the water column acting thereon, approaches the desired steam pressure in the main 26, whereupon the valve moves to closed position. The spring supported arm 95 permits a yielding engagement between the flanged extension 102 and the cam 101 and assures that these two parts will be held in contact during the intended intervals when the valve is to be closed, and assures that the motor 37 will not be injured by further movement after valve discs 86 have been seated and valve lever 88 cannot be moved further. The adjustable pin and slot means 94 permits the relative elevation of the arms 92 and 95 to be adjusted for proper operation by the cam 101, corresponding to various adjustments of the weights on the lever 88.

It is important that the opening and closing of the valve 28, by the motor 37, shall require but a very small portion of each short time cycle. If desired, a regulating valve may be provided separate from the periodically operated main valve instead of using the single valve to interrupt as well as to regulate the pressure of the flow of steam. In order to provide for any necessary repairs, adjustments or replacements in the regulating valve, an additional "stand-by" regulating valve may be provided if desired located in another by-pass around the valves such as at 28, 59 and 60. Then whenever for any reason the regulating valve is out of commission, the "stand-by" regulating valve will be available for use.

With the particular form of pressure reducing valve shown in Fig. 4, at the beginning of an "on" interval a relatively large quantity of steam will be promptly admitted to the steam main 26 during the first half minute or so of the opening of the valve, and until sufficient pressure is built up in the main 26 to react on the diaphragm 89. This initial supply of a large quantity of steam at the beginning of the "on" intervals is particularly beneficial with the system as shown with radiator orifices, in that the piping will be promptly filled with steam throughout, so that immediately thereafter the desired proportional distribution of steam through all of the radiator orifices will begin substantially simultaneously and continue during the remaining part of the "on" period while steam is under regulated pressure. This feature of the method is particularly important in cases where it may be found inadvisable to use the by-pass 30.

Except for the features above referred to, the usual practice may be followed as to the construction and operation of the pressure regulating valves.

Reference will now be had to Fig. 5 showing the operation of the quick exhaust valve 82 in conjunction with the pressure reducing valve 28. As indicated, the valve stem 87 of the pressure reducing valve, or else a rod connected thereto as at 103, may be extended up through the top of the valve 28 to operate valve members as at 104 within the valve 82, conjointly with the operation of the valve 28, whereby the valve 82 is opened whenever the valve 28 is closed. Accordingly at the beginning of each "off" interval when the valve 28 is closed, steam may be exhausted through passages as at 105 and 106 through the valve 82 to conduit 83, but any tendency for return flow of steam or air through this conduit is prevented by the check valve 85. Thus promptly at the beginning of each "off" interval the pressure of the steam within the steam main and the piping system may be quickly reduced to permit the return flow of the condensate through the radiators to begin promptly. In many systems, however, this quick exhaust valve will be found unnecessary.

Figure 6:
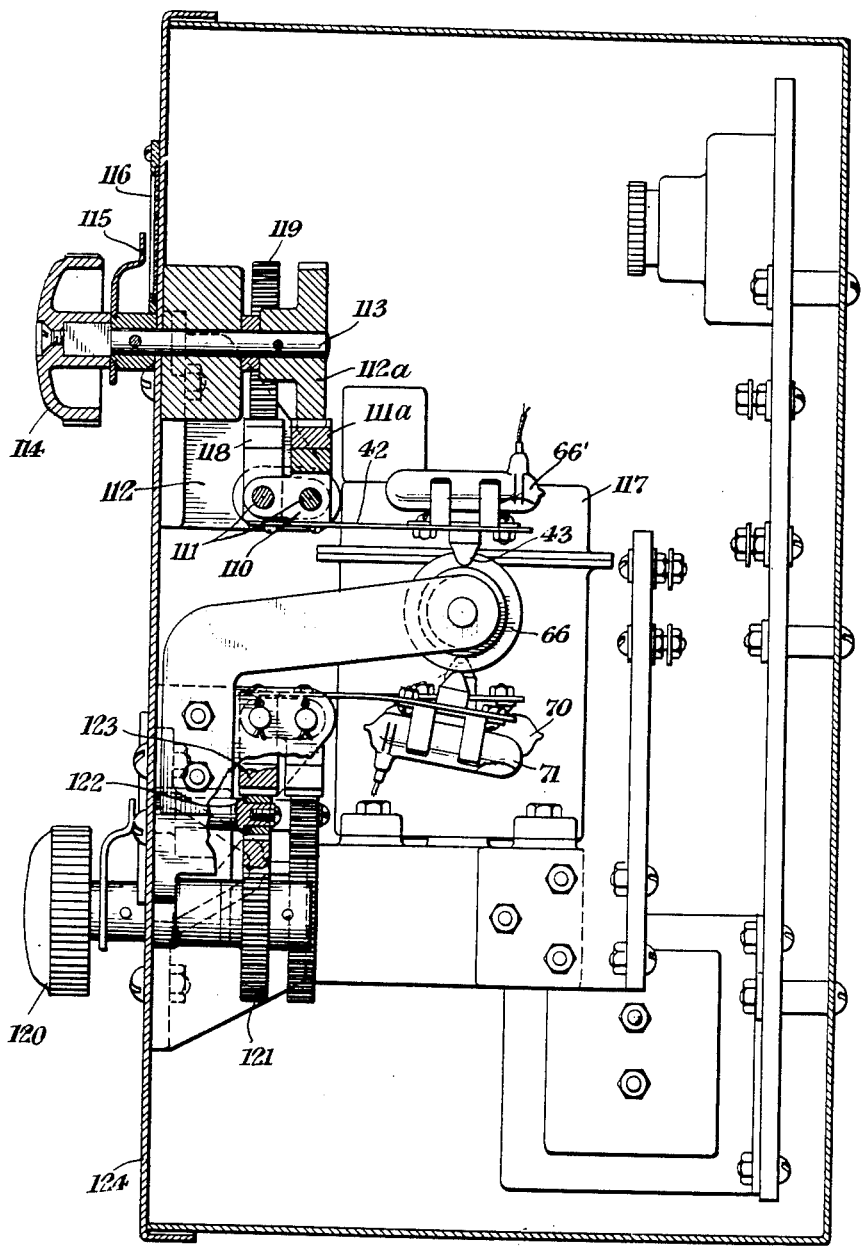

Reference will now be had to Figs. 6 and 7 illustrating in further detail, mechanism for manually adjusting the position of the control switches in respect to the operating cams therefor. While a simplified means for making such an adjustment is indicated at 47 in Fig. 1, in practice it is desirable to provide means including rotatable knobs with accompanying dials conveniently located in one place for differently adjusting the control switches for several zones. In Figs. 6 and 7 mechanism for this purpose is shown in connection with the control switches and associated cams for four different zones, with the switches and cams arranged in the manner more schematically indicated in Fig. 3. In Fig. 6 the mercury switch 66' is provided with a spring arm 42, which in turn is fixed to a support 110. This support may be slidably mounted on a pair of rods as at 111 fixed in a frame 112. The support 110 may be formed with a rack 111a adapted to be engaged by a pinion 112a mounted on a rotatable shaft 113, carrying a manually rotatable knob 114 and an indicating pointer 115 cooperating with a graduated dial 116. Thus by turning the knob 114, the support 110 together with the mercury switch 66' and its cam engaging finger 43, may be moved as a unit longitudinally in respect to the axis of the rotatable cam 66. The cam may have a raised area as described in connection with Fig. 1, the cam being rotated at constant speed by a motor 117 connected to the cam through gearing of any suitable well-known type. An additional mercury switch with a similar operating cam and supporting parts, may be mounted in back of the parts above described and as viewed in Fig. 6, to provide for another heating zone. The rack and pinion for operating this additional switch are shown in part at 118 and 119 respectively in Fig. 6. Additional mercury switches 70 and 71 corresponding respectively to a third and fourth heating zone are also indicated in Fig. 6 in the same relationship in respect to their operating cams as indicated in Fig. 3. The operating means for positioning the switches 70 and 71 may be similar to that above described in connection with switch 66' and the operating means for switch 71 may include for example a knob 120 fixed to rotate with a pinion 121. The pinion 121 may rotate another pinion as at 122, which in turn engages a rack as at 123 similar to the racks 111 and 118. The pinion 122 serves to reverse the relative movement of the pinion 121 and rack 123, as compared with the operation of pinion 112 and rack 111, whereby both the upper and lower knobs as at 114 and 120, may be turned by the operator in the same direction upon an increase in heat demand. The mechanism for adjusting the position of switch 70 may be similar to that for switch 71 and its construction will be apparent from the drawings without further explanation.

Thus a plurality of adjacent adjustable knobs may be readily provided at one location permitting the attendant to adjust the control switches for each zone individually in accordance with the heating requirements of each zone. These requirements may vary for the different zones, depending upon wind conditions, the direction from which sunlight strikes the structures of the various zones, or the uses to which the spaces are devoted, corresponding to the various zones, may vary so as to necessitate different heating requirements.

The mechanism referred to in connection with Figs. 6 and 7 may be mounted on a suitable panel as at 124 and enclosed in a housing as indicated, which may also include the power supply connections, fuses, transformers, etc.

*Thermostatic regulation of periods of steam flow*

With the embodiments of my invention as above described, manual means have been disclosed for adjusting the proportion of elapsed time occupied by the "on" periods of steam flow. While such manual adjustment is satisfactory under some circumstances for large installations where an attendant may be kept available for making the necessary adjustments promptly upon substantial changes in the temperature conditions, yet much more accurate and more fully automatic adjustment for such varying conditions may be made by thermostatically controlled apparatus which will now be described in connection with Figs. 8 to 13 inclusive. As shown in Fig. 8, a cam assembly 125 is provided with a plurality of separate cam elements, formed of insulation material, and all fixed to a uniformly rotating shaft. The periphery of this group of cam elements, if taken collectively, may have a contour substantially equivalent to the contour of the cam 44 above described. However, the cam is divided into separate elements so that each element respectively serves to operate one of a group of contact arms as at 126, each of said contact arms having a contact adapted to connect or disconnect an electrical circuit with a bus as at 126'. A plurality of groups of contact arms such as at 126 may be provided in angularly spaced positions around the cam assembly 25, one group for each heating zone to be controlled. For purposes of illustration in Fig. 8, a schematic developed view is shown of four of such groups of contact arms 126, 127, 128 and 129, with contacts cooperating respectively with busses 126', 127', 128' and 129'. These groups of contacts respectively may be arranged in angularly spaced relationship, for example 90° apart, at the top, left, bottom and right of the cam assembly 125. Accordingly when the cam assembly 125 is rotated as by a motor or clock works, connected by gearing as indicated, each of the cam elements will successively operate its corresponding contact arm in each of the four groups of contacts for establishing circuit connections to the busses 126', 127', etc., respectively in interspaced relationship. Such interspaced relationship is for the purpose of providing, as above explained, "on" periods of steam flow, also in interspaced relationship for the various zones. The details of construction of a preferred form of this cam and switch mechanism will be further described hereinafter in connection with Figs. 9 and 10.

A thermostat as at 130 may be provided, preferably out of doors or at some location where the temperature varies substantially in accordance with outdoor temperature changes, independently of the temperature in the spaces heated. According to some phases of the invention, however, this thermostat may be located in a room wherein the temperature is intended to be typical or representative of the spaces heated by the system or where the temperature changes are in proportion to such temperature. This thermostat may comprise a movable bi-metallic member 131 having a fixed electrical connection 132. The movable end of the member 131 may be provided with a suitable contact such as a roller 133 for variably engaging, in accordance with temperature changes, a series of fixed contacts $a$ to $m$ as indicated. Substantially the same number of contacts $a$ to $m$ may be provided as there are contacts in each of the groups as at 126 above referred to. However, each of the contacts $a$ to $m$ respectively may not always correspond to a particular one of the contacts of group 126, since it may be desirable to shift the relative relationship of these two groups of contacts from time to time to provide for varying heating requirements in each zone individually. For shifting such relative relationship of the contacts, manually operable switches as at 134, 135, 136 and 137 may be provided, one for each of the zones Nos. 1 to 4 respectively, in case the system is adapted for four zones as indicated. Each of the switches 134 may be provided with a plurality of movable contacts as at 138, all fixed to a pivoted support adapted for turning adjustment by a knob 139. Each of these movable contacts respectively corresponds to and is connected to one of the contacts such as of the group 126. The switches as at 134 may also be provided with a corresponding number of fixed contacts as at 140 equal in number and corresponding respectively to the fixed contacts $a$ to $m$ on thermostat 130. Then in order to avoid "feed back" circuits as between the various thermostat contacts when the switches 134 to 137 are differently adjusted, the thermostat may be arranged to control the connections to this group of switches through a group of relays 141.

The circuit of one of the fixed contacts of the thermostat may now be traced from contact $m$ through the roller contact 133, thermostatic element 131, connection 132, source of power 142 to a relay magnet $m$ corresponding to contact $m$, and through connection 143 back to contact $m$. When the magnet of relay $m$ is energized by this circuit, current may pass from a source of power 144 through any one or all of the four relay contacts $m1$, $m2$, $m3$, $m4$ to corresponding fixed contacts $m1$, $m2$, $m3$, $m4$ mounted respectively upon the zone adjusting switches 134 to 137, as indicated, and thence through the corresponding adjustable contacts as at 138 of these switches, to corresponding contacts of the groups 126 to 129. Thus, depending upon the position of the thermostat 130, one of the contacts of each of the groups 126 to 129 will be selected, and as a result of its intermittent operation by an element of the cam assembly 125, current will be intermittently applied to each of the busses 126' to 129'. From the bus 126', for example, the circuit may be traced through a pair of indicating lamps as at 145. The intermittent flashing of these lamps and of similar lamps for each of the other busses, will serve to indicate to the attendant that the circuit for each of the zones is being periodically energized in the proper manner. Two of these lamps may be connected in parallel so that if one burns out, the circuit will be maintained through the other. The lamps corresponding to each of the zones respectively may preferably be located on the same panel with or adjacent the switches 134 to 137 for convenient observation by the attendant. From the lamps 145, the circuit may continue through a connection 146 to a manually operable cutout switch as at 147, through an "over-heat limit thermostat" 148, through a float operated switch 149, thence through the magnet of a control relay 150, back to the source of power 144. The relay 150 may correspond in function to the relay 63 referred to in connection with Fig. 3 for controlling the pressure regulating main valve 59, and its contacts may be connected in like manner.

Thus, when the thermostat 130 is at a temperature such that contact will be made at its contact $m$, for example, this will cause relay 150 to be periodically energized at intervals of a length depending upon which of the contacts of the group 126 is energized and this will in turn depend upon the manual adjustment of the switch 134. The contour of the cam element operating the selected contact will determine the resulting relative lengths of the "on" and "off" periods of steam supply.

The switch 147 may be preferably located at or adjacent the corresponding switch panel 134 of its circuit, so that if the attendant should desire to cut off the heat for the corresponding zone, he may conveniently do so without danger of confusing the switch for this zone with other corresponding switches which may be provided for the other zones.

The "over-heat limit thermostat" 148 may preferably be located within one of the typical spaces heated by the system and serves to disconnect its circuit and accordingly cut off the heat for the corresponding zone, if for any reason the temperature in such representative space exceeds a predetermined maximum limit.

The float operated switch 149 may be located at one of the representative radiators heated by the system and arranged to disconnect its circuit and thus shut off the heat supply to its corresponding zone, if for any reason the condensate in such radiator rises to an abnormal height with the danger that the condensate might be expelled from the radiator air valves.

Each of the contacts $a$ to $m$ respectively on the thermostat 130 similarly serves to control a magnet of one of the relays $a$ to $m$, which relays in turn each control one corresponding fixed contact in each of the switches 134 to 137. That is, for example, the relay $a$ may have four contacts connected respectively to contacts a1, a2, a3, a4 of the switches 134, 135, 136, 137 respectively.

The circuit connections for the remaining zones may be similar to those above described for zone #1 so as to control the main pressure regulating valve relays as at 151, 152 and 153 respectively for zones Nos. 2, 3 and 4. The circuits for the relays for each of these zones respectively may be provided if desired, with a float operated switch, an "over-heat limit thermostat" and a manually operable cutout switch as in the case for zone #1, but for clearness and to avoid duplication, the same have been omitted in the diagram of Fig. 8.

As indicated in Fig. 8, the by-pass 30 around the main valve 59 may be provided with a motor operated cutout valve 62 controllable through a relay as at 154 in a manner similar to the relay control of the main valve. The magnet of relay 154 may be connected through a manually operable cutout switch 155, to a source of power as at 144. A cutout switch such as at 155 for each zone may preferably be located on or adjacent the switch panel as at 134 of the corresponding zone.

In order that a circuit may be completed through thermostat 130, notwithstanding the movement of the contact wheel 133 from time to time, from one of the fixed contacts to another, this wheel may preferably be made of such dimensions as to continue in contact with one of the contacts a to m until it is firmly in engagement with the next adjacent contact. Accordingly a circuit may sometimes be completed through two of the fixed contacts of the thermostat with a consequent concurrent operation of two of the relays a to m. Accordingly two of the contacts at each of the groups as at 126 may also be energized at such times. This, however, will not interfere with the proper operation of the equipment, since at such times the relays as at 150, will be energized by the first of the two energized contacts of the group 126 to be operated by the cam assembly, and the de-energization of the relay will be controlled by the last of said two contacts to be operated.

It will be understood that the control apparatus shown in Fig. 8 may be applied to any of the various systems and modifications illustrated and described in connection with Figs. 1, 2 and 3. However, instead of manually adjusting the position of the cam operated switches, the arrangement of Fig. 8 provides a plurality of switches in spaced locations along the cam and these switches are selected for operation automatically by the action of the thermostat 130, modified if desired by the manual control switches as at 134 to provide different heating requirements for each zone. The arrangement of Fig. 8 thus provides means for interrupting the flow of steam through the mains for a plurality of zones which may be supplied from a common source of steam, and the proportion of elapsed time occupied by the intervals of interruption, is thermostatically regulated preferably in proportion to outdoor temperature changes. It will be understood that the spacing of the contacts on thermostat 130 as well as the contours of the various cam elements, may be readily made such as to provide for this proportional relationship, so that the quantity of heat admitted to each part of the system will be thermostatically regulated in accordance with outdoor temperature changes.

The thermostat 130 may ordinarily be placed at a considerable distance from the remainder of the control equipment. The system of electrical connections shown in Fig. 8 provides a dependable, relatively inexpensive and flexible means for thus remotely controlling the equipment by the thermostat.

Reference will now be had to Figs. 9 and 10 showing the details of construction of the cam assembly 125 and the contacts operated thereby. The motor or clock works for rotating the cam assembly 125 is indicated at 156 connected through suitable gearing 157 to rotate a shaft 158 carrying the assembly of cam elements. The several groups of contact arms 126, 127, 128, 129 with their corresponding busses 126', etc. in their angularly spaced relationship about the cam assembly 125, clearly appear in Fig. 9. Figs. 9 and 10 also illustrate by way of example a preferred form of supporting means for these various contacts and their terminal connections. The details of construction of such supporting means will be apparent from these figures without further description.

Reference will now be had to Figs. 11 to 13 inclusive, illustrating the details of construction of a preferred form of the thermostat 130. The bi-metallic thermostatic element 131 may be mounted with one end fixed to a suitable support as at 160 and with its other end connected to a rotatable shaft 161 by suitable clamping means as at 162. The shaft 161 is mounted free to turn in respect to a suitable support as at 163. The shaft may carry a yieldable spring pressed arm as at 164, which in turn carries the contact wheel 133 in position for engagement with the various contacts a to m in response to the expansion or contraction of the bi-metallic element under varying temperature conditions. The wheel contact 133 may be submerged in a bath of oil or other fluid material for suppressing electrical arcs, contained in a small receptacle as at 165. The thermostat assembly may be mounted in a suitable housing as at 166 having a screen as at 167 permitting the prompt access of air of the varying temperatures to the thermostatic element. As shown, the contact operating parts and electrical terminal connections may be protected within a separate enclosure within the housing. In other respects the details of construction of the thermostat will be apparent from Figs. 11 to 13 of the drawings.

In Fig. 14 one form of normally fixed orifice plate or member is indicated at 170 for controlling the proper distribution of steam to the inlets of various radiators. The member 170 may have an aperture of a size depending upon the size of the adjacent radiator and its position in the system as above explained. This member may be suitably secured to or within an apertured disc 171 of the shape shown and having its periphery preferably somewhat flexible and designed to be clamped in sealing relationship between the opposed faces of a pair of union members 172 and 173 which may be of conventional design. This construction provides a simple means for applying an orifice member of predetermined size to an existing radiator installation. That is, it is merely necessary to open up the union adjacent the radiator and insert the orifice assembly in the manner indicated. In Fig. 15 another type of orifice member is indicated at 174 designed to be clamped in position between a nipple 175 and a radiator fixture as at 176. In Fig. 16 a preferred form of orifice assembly is indicated at 177 mounted within a valve 178, which may be of a conventional construction in other respects. The assembly 177 may comprise a cylindrical vertically extending supporting portion secured within the side walls of the valve opening, as for example by a forced fit. An orifice plate 179 having an aperture of the predetermined size may be suitably mounted as shown in a horizontal position within its supporting member. The orifice assembly shown in Fig. 16 is particularly desirable for use with the above described systems, since with the aperture in a horizontal position, it is generally either entirely free of condensate so that the steam may flow therethrough unhampered, or if any condensate is available to flow through the orifice then the orifice will be wholly or largely filled with the condensate until withdrawn down to a level where none will flow through the orifice. Thus there will be little possibility that the orifice will be variably or irregularly restricted in size as a result of being partially filled with condensate. The methods of designing the orifices of predetermined size at the various radiator inlets, as well as the normally fixed orifice members which may be placed at various other parts of the piping system to aid proper steam distribution, are further set forth in the patent to Donnelly, No. 1,681,725, granted August 21, 1928. An orifice arrangement particularly adaptable for use with the above described "one-pipe" systems is disclosed in the copending application of Samuel M. Brooks, Ser. No. 19,357, filed May 2, 1935, entitled "Heating systems and apparatus."

Fig. 17 illustrates a preferred form of radiator air valve suitable for the above described systems. It may comprise a casing 180 containing an expansible thermostatic bellows member 181 which may be of conventional form, for controlling the position of a valve member 182 in respect to an outlet 183. The inlet for gases or steam to this valve is indicated at 184. A siphon tube for the withdrawl of condensate from the valve is indicated at 185. This form of valve is particularly adaptable for the above described systems in that it operates to close the outlet quickly upon being subjected to the steam temperature and also opens quickly to provide a relatively large air inlet as soon as its temperature is lowered to a predetermined degree.

Reference will now be had to Figs. 18, 19 and 20 illustrating the float controlled switch 149 and its associated connections as above referred to in the description of Fig. 8. This switch is preferably mounted adjacent the base of one of the radiators 25 of that part of the heating zone most likely to be troubled with excess accumulations of condensate. A steam connection is indicated at 190 communicating with the radiator inlet 191, through a float chamber 192. A float 193 may be pivotally mounted as at 194 within this chamber. The float supporting arm may be provided with an extension 195 terminating in a pin 196 normally supporting one end of a steam tight flexible unit 197 in the position shown. This flexible unit may be sealed within a suitable plug member 198, the latter in turn being sealed within and extending through a wall of the chamber 192. A rod 199 may have one end fixed as at 200 inside the inner end of the flexible unit 197 and its outer end rigidly affixed in a member 201 pivotally mounted as at 202. A lever 203 is rigidly affixed to the member 201 to turn therewith. The enclosed mercury switch 149 may be mounted in a tiltable supporting member 204 connected through a link 205 with the upper end of lever 203. A spring 206 may be provided for normally urging the lever 203 toward the right, but motion in that direction is normally counterbalanced by the action of the float 191 which holds the pin 196 against the flexible unit 197. However, if in any emergency, conditions should arise such as would cause an abnormal amount of condensate to accumulate within the radiator 25 and in the chamber 192, and such as to cause the float to be elevated substantially from the position shown, then the inner end of the flexible member 197 will be permitted to drop to an extent such that the above described levers and links will cause the switch 149 to be tilted to open the main valve operating circuit at contacts 207 (Fig. 19). Immediately thereafter contacts 208 at the other end of the switch will be brought into operation for closing a circuit to suitable alarm devices such as a bell 209 and a light 210 supplied with power from a suitable source of current as at 211. Thus an abnormal rise of condensate in the radiator system will cause the main valve operating circuit to be disconnected for cutting off the steam supply, and the alarm devices will indicate that fact to the attendant. If similar float controlled switches and alarm circuits are provided for each zone, the attendant will also be apprised of the zone of the heating system in which the difficulty occurs, and the circuit for controlling such zone will remain open until such time as the excess accumulated condensate has opportunity to drain off or is otherwise removed.

While the invention has been described with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and desired to be secured by Letters Patent of the United States is:

1. In a heating system, a plurality of radiators, a common supply main for supplying steam to said radiators, conduits for conducting steam from said main to said radiators and through which condensate is withdrawn from said radiators, a valve in said supply main, means for operating said valve to intermittently check and release the flow of steam therethrough at relatively short intervals, and an exhaust valve controlled conjointly with said first named valve and serving to rapidly exhaust steam from said main during the periods of checking of the flow of steam through said first named valve, whereby the rapid return flow of condensate through said conduits is facilitated during said periods of checking.

2. In a heating system, a plurality of radiators, a common supply main for supplying steam to said radiators, conduits for conducting steam from said main to said radiators respectively and for withdrawing condensate from said radiators, each of said conduits embodying a normally fixed orifice to control the flow of steam to each radiator at a predetermined rate for a given pressure in the supply main, means for intermittently supplying steam to said conduits through said supply main at relatively closely spaced intervals, and an exhaust valve for quickly exhausting steam from said conduits during the periods between the intervals of supply of steam, whereby the return flow of condensate through said conduits and the orifices therein is facilitated during said periods.

3. In a heating system, radiating means, a steam main, conduits for connecting said steam main with said radiating means respectively, a valve in said steam main, means for intermittently operating said valve to alternately shut off and turn on the steam therethrough, an exhaust valve communicating with said conduits, means for operating said exhaust valve conjointly with said steam main valve, whereby the exhaust valve is opened to quickly reduce the pressure in said conduits when the steam supply is cut off, means for utilizing the steam escaping through said exhaust valve, and a check valve between said last named means and said exhaust valve for preventing a return flow of steam through said exhaust valve.

4. In a heating system for heating a plurality of zones, each having radiating units, electrically operated means individual to each of said zones for alternately admitting and checking the flow of the heating medium to the radiating units thereof, thermostatic means, a plurality of relays connected to be selectively rendered operable by said thermostatic means as a result of temperature changes, a plurality of groups of switches, each group corresponding to a zone, each of said switches being connected to operate one of said electrically operated means intermittently with periods of operation differing from the periods of operation corresponding to the other switches for the same zone, and connections from said relays to said switches whereby operation of one of said relays serves to place in operative condition one of said switches of each group.

5. In a heating system for heating a plurality of zones, each having radiating units, electrically operated means individual to each of said zones for alternately admitting and checking the flow of the heating medium to the radiating units thereof, thermostatic means, a plurality of relays connected to be selectively rendered operable by said thermostatic means as a result of temperature changes, a plurality of groups of switches, each group corresponding to a zone, each of said switches being connected to operate one of said electrically operated means intermittently with periods of operation differing from the periods of operation corresponding to the other switches for the same zone, connections from said relays to said switches whereby operation of one of said relays serves to place in operative condition one of said switches of each group, and a plurality of independently adjustable means, one corresponding to each zone, for shifting the relationship of the switches of each zone in respect to the corresponding connections to said relays.

6. In a heating system for heating a plurality of zones, each having radiating units, electrically operated means individual to each of said zones for alternately admitting and checking the flow of the heating medium to the radiating units thereof, thermostatic means, a plurality of relays connected to be selectively rendered operable by said thermostatic means as a result of temperature changes, a plurality of groups of switches, each group corresponding to a zone, each of said switches being connected to operate one of said electrically operated means intermittently with periods of operation differing from the periods of operation corresponding to the other switches for the same zone, connections from said relays to said switches whereby operation of one of said relays serves to place in operative condition one of said switches of each group, and a plurality of manually adjustable switches, one corresponding to each zone, for altering the connections to said first named switches, whereby the lengths of the periods of operation for one zone may be altered in respect to the lengths of the periods of operation for other zones.

7. Apparatus for regulating the supply of steam to a heating system having a plurality of radiators located in rooms, the temperature of which is affected by variations in outdoor temperature, comprising time controlled means for intermittently supplying and interrupting a supply of steam to the radiator system in cycles, with the intervals of supply and interruption both normally substantially fixed in length for a given outdoor temperature, said time controlled means including a rotatable cam structure comprising a plurality of differently shaped sections, an electrically controlled steam valve, a plurality of switches for controlling said valve, each of said switches being operated by one of said cam sections, and thermostatic means responsive to outdoor temperature changes for selectively applying current to one or another of said switches depending upon the outdoor temperature.

8. Apparatus for controlling the supply of steam to a steam heating system comprising an electrically operated valve, a plurality of switches and connections therefor, each of said switches being adapted to open and close a circuit for operating said valve, a rotatable cam structure having a plurality of differently shaped sections, each section being adapted to operate one of said switches and to thereby periodically operate said valve, and electrical thermostatic means for selectively energizing said switches for operation whereby each one of said switches will be selected for operation respectively while the prevailing temperature at said thermostatic means remains within a comparatively small temperature range comprising a predetermined divisional part of the entire temperature range to which said thermostatic means is responsive.

9. Apparatus for distributing steam to a steam heating system having a plurality of groups of radiators for serving respectively various zones of the structures to be heated, a source of steam, conduits running respectively from said source to each of said groups, an electrically controlled valve in each of said conduits, time controlled means for intermittently operating said valves to check the flow of steam from said source to the conduits for each of said groups respectively at substantially interspaced intervals, said means including a plurality of groups of switches, each group controlling one of said valves, a continuously rotatable cam structure, each switch of a group being closed by said cam structure during intervals of a different length and each group being operated respectively by said cam structure when at different angular positions, and means for selecting one of the switches of each group and completing an operating circuit therethrough.

10. In a heating system for heating a plurality of zones, each having radiating units, electrically controlled means individual to each of said zones for alternately admitting and checking the flow of the heating medium to the radiating units thereof, a plurality of groups of switches, each group corresponding to a zone, means for closing and opening each of said groups of switches respectively in cycles normally of a predetermined frequency, each of said switches being connected to operate one of said electrically controlled means intermittently with periods of operation differing from the periods of operation corresponding to the other switches for the same zone, and thermostatic means and circuits controlled thereby for selectively applying current to a switch of each group depending upon the temperature affecting said thermostatic means.

11. In a heating system for heating a plurality of zones, each having radiating units, electrically controlled means individual to each of said zones for alternately admitting and checking the flow of the heating medium to the radiating units thereof, a plurality of groups of switches, each group corresponding to a zone, means for closing and opening each of said groups of switches respectively in cycles normally of a predetermined frequency, each of said switches being connected to operate one of said electrically controlled means intermittently with periods of operation differing from the periods of operation corresponding to the other switches for the same zone, thermostatic means and circuits controlled thereby for selectively applying current to a switch of each group depending upon the temperature affecting said thermostatic means, and means for altering said circuits for the switches of each group independently of the circuits for the switches of other groups whereby the lengths of the periods of operation for one zone may be altered in respect to the lengths of the periods of operation for other zones.

12. Apparatus for regulating the supply of steam to a heating system having a plurality of radiators located in rooms, the temperature of which is affected by variations in outdoor temperature, comprising time controlled means for intermittently supplying and interrupting a supply of steam to the radiator system in cycles, with the intervals of supply and interruption both normally substantially fixed in length for a given outdoor temperature, said time controlled means including a rotatable circuit controlling device comprising a plurality of differently shaped portions or sections, an electrically controlled steam valve, a plurality of contacts for controlling said valve, each of said contacts being adapted to cooperate with one of said sections to control current for operating said valve, and thermostatic means responsive to outdoor temperature changes for selectively applying current to one or another of said contacts depending upon the outdoor temperature.

13. Apparatus for controlling the supply of steam to a steam heating system, comprising an electrically operated valve, a plurality of circuit controlling members and connections therefor, each of said members being adapted to open and close a circuit for operating said valve, a rotatable structure having a plurality of differently shaped portions or sections, each section being adapted to cooperate with one of said members for periodically interrupting current to operate said valve, and electrical thermostatic means for selectively energizing said members for operation whereby each one of said members will be selected for operation respectively while the prevailing temperature at said thermostatic means remains within a comparatively small temperature range comprising a predetermined divisional part of the entire temperature range to which said thermostatic means is responsive.

14. Apparatus for distributing steam to a steam heating system having a plurality of groups of radiators for serving respectively various zones of the structures to be heated, a source of steam, conduits running respectively from said source to each of said groups, an electrically controlled valve in each of said conduits, time controlled means for intermittently operating said valves to check the flow of steam from said source to the conduits for each of said groups respectively at substantially interspaced intervals, said means including a plurality of groups of circuit contacts, each group controlling one of said valves, a continuously rotatable circuit controlling device, each contact of a group being closed by said device during intervals of a different length and each group being operated respectively by said device when at different angular positions, and means for selecting one of the contacts of each group and completing an operating circuit therethrough.

15. In a heat transfer system having a source of heat transfer medium and a plurality of zones to be supplied with said medium, the combination of separate means for controlling the flow of the medium to each of said zones, means for jointly controlling said first mentioned means to distribute said medium to each of said zones periodically and sequentially for each of a plurality of different lengths of time, and means controlled in response to outdoor temperature changes for selecting the predetermined length of time, said last named means including a plurality of selectively operable devices one for each predetermined length of time and each adapted to render said first mentioned means operative under the control of said second mentioned means.

16. A heat transfer system having a source of heat transfer medium, a plurality of zones to be supplied with said medium, separate means for controlling the flow of said medium to each zone, means for jointly controlling said first mentioned means to distribute said medium to each zone periodically and sequentially for varying lengths of time, said second named means including a continuously operating cycling apparatus providing a plurality of predetermined time cycles, and means controlled in response to outdoor temperature for selecting one of said time cycles, said last named means including a plurality of selectively operable devices one for each time cycle and each adapted to render said first mentioned means operative under the control of said apparatus.

17. In a heat transfer system having a source of heat transfer medium and a plurality of zones to be supplied with said medium, the combination of separate electro-responsive means for controlling the flow of the medium to each of said zones, continuously rotating circuit controlling means for controlling said first mentioned means to distribute said medium to each of said zones periodically and sequentially for each of a plurality of different lengths of time, and means controlled in response to outdoor temperature for selecting a predetermined length of time, said last named means including a plurality of selectively operable relays one for each of said different lengths of time, each relay adapted to energize a different circuit to said first mentioned means through said second mentioned controlling means.

18. In a heat transfer system having a source of heat transfer medium and a plurality of zones to be supplied with said medium, the combination of separate electroresponsive means for controlling the flow of the medium to each of said zones, continuously rotating circuit controlling means for controlling said first mentioned means to distribute said medium to each of said zones periodically and sequentially for varying lengths of time, and means controlled in response to outdoor temperature for selecting a predetermined length of time, said last named means including a plurality of separately operable relays of which not more than two are adapted to be energized simultaneously and each of which is adapted to energize independent circuits to said first mentioned means through said second mentioned controlling means.

19. In a heat transfer system having a source of heat transfer medium and a plurality of zones to be supplied with said medium, the combination of separate electroresponsive means for controlling the flow of said medium to each zone, means fo controlling said first mentioned means to distribute said medium periodically and sequentially for varying lengths of time, said last named means including a continuously rotating circuit controller having a section for controlling each zone, each section having contact means for varying the said length of time, and means controlled in response to outdoor temperature for selecting a predetermined length of time including a plurality of relays, each relay controlling independent circuits to predetermined contact means on each of said controller sections.

20. In a heat transfer system having a source of heat transfer medium and a plurality of zones to which said medium is to be supplied, the combination of separate means for controlling the flow of medium to each zone, electroresponsive actuating means therefor, control means comprising an individual section for each of said actuating means having a plurality of interconnected contact means electrically connected to said actuating means, normally open branch circuits adapted to make electrical contact with each of said contact means to energize said actuating means, and means controlled in response to outdoor temperature for selectively closing branch circuits to predetermined contacts on each controller section.

21. In combination, a predetermined number of zones to be heated, means for controlling the flow of steam into said zones, electroresponsive actuating means therefor, means for controlling the actuating means to distribute steam to each zone periodically and sequentially for varying lengths of time including an independent section for each zone, said sections having a second predetermined number of contact means to provide said varying lengths of time, means controlled in response to outside temperature for selecting a predetermined length of time, said last named means including a thermostat and a plurality of relays adapted to be selectively energized by said thermostat to close an independent circuit through a selected contact means on each of said sections to render said actuating means operative under the control of said second mentioned control means.

22. A control for a multiple zone heat transfer system comprising in combination, separate means for controlling the flow of the heat transfer medium to each of said zones, means jointly controlling said first named means to distribute said medium to each of said zones periodically and sequentially for varying lengths of time during each period, and means controlled in response to the temperature without said zones for selecting a predetermined length of time, said last named means including a plurality of selectively operable devices each adapted to render said first mentioned means independently operative under the control of said second mentioned means.

23. A control for a multiple zone heat transfer system comprising in combination, separate means for controlling the flow of the heat transfer medium to each of said zones, means for jointly controlling said first named means to distribute said medium to each of said zones periodically and sequentially for varying lengths of time, said second named means including apparatus for controlling each of said first named means independently, means controlled in response to outdoor temperature for selecting a predetermined length of time, said last named means including a plurality of selectively operable devices each adapted to render said first mentioned means independently operative under the control of said second mentioned means.

24. In combination, a predetermined number of electrical control means, means including a controller having a corresponding number of sections each having a second predetermined number of separate contact means for periodically and sequentially energizing said control means for varying lengths of time, and means including a predetermined number of relays corresponding to said second predetermined number of means, and thermal responsive means adapted to energize said relays for establishing a separate circuit connection with a corresponding one of said separate contact means on each section of said controller.

KARL W. ROHLIN.